United States Patent
Messenger et al.

(10) Patent No.: US 8,499,198 B1
(45) Date of Patent: Jul. 30, 2013

(54) TESTING DATA STORAGE DEVICES RUNNING DIFFERENT VERSIONS OF AN OPERATING SYSTEM

(75) Inventors: Carl R. Messenger, Mission Viejo, CA (US); Karsten C. Strecke, Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 266 days.

(21) Appl. No.: 12/967,722

(22) Filed: Dec. 14, 2010

(51) Int. Cl.
*G06F 11/00* (2006.01)

(52) U.S. Cl.
USPC .............................. 714/42; 717/173

(58) Field of Classification Search
USPC .............................. 714/42; 717/173
See application file for complete search history.

(56) References Cited

U.S. PATENT DOCUMENTS

| | | | |
|---|---|---|---|
| 6,169,413 B1 * | 1/2001 | Paek et al. | 324/750.07 |
| 6,651,192 B1 | 11/2003 | Viglione et al. | |
| 7,076,391 B1 * | 7/2006 | Pakzad et al. | 702/118 |
| 7,596,722 B1 * | 9/2009 | Pakzad et al. | 714/42 |
| 7,676,700 B2 | 3/2010 | Fan et al. | |

\* cited by examiner

*Primary Examiner* — Yolanda L Wilson

(57) ABSTRACT

A data storage device (DSD) test system is disclosed comprising a first DSD tester operable to download a first version of an operating system to a first DSD and execute a first test on the first DSD, and a second DSD tester operable to download a second version of the operating system to a second DSD and execute a second test on the second DSD while the first DSD tester is executing the first test on the first DSD.

20 Claims, 4 Drawing Sheets

TESTING DATA STORAGE DEVICES RUNNING DIFFERENT VERSIONS OF AN OPERATING SYSTEM

BACKGROUND

Data storage devices (DSDs), such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., Flash memory). A DSD manufacturer will typically employ a number of tests stations for executing an extensive suite of tests when developing a new line of DSDs in order to develop and validate various aspects of the operating system that controls operation of the DSD. If an error is encountered while testing a particular version of the operation system, all of the test stations are typically paused so that the problem can be resolved and an updated version of the operating system loaded into the DSDs. This slows development time of the operating system as well as increases development cost since the test stations remain idle while updating the operating systems of the DSDs connected to the test stations.

DETAILED DESCRIPTION OF EMBODIMENTS OF THE INVENTION

Figure 1:
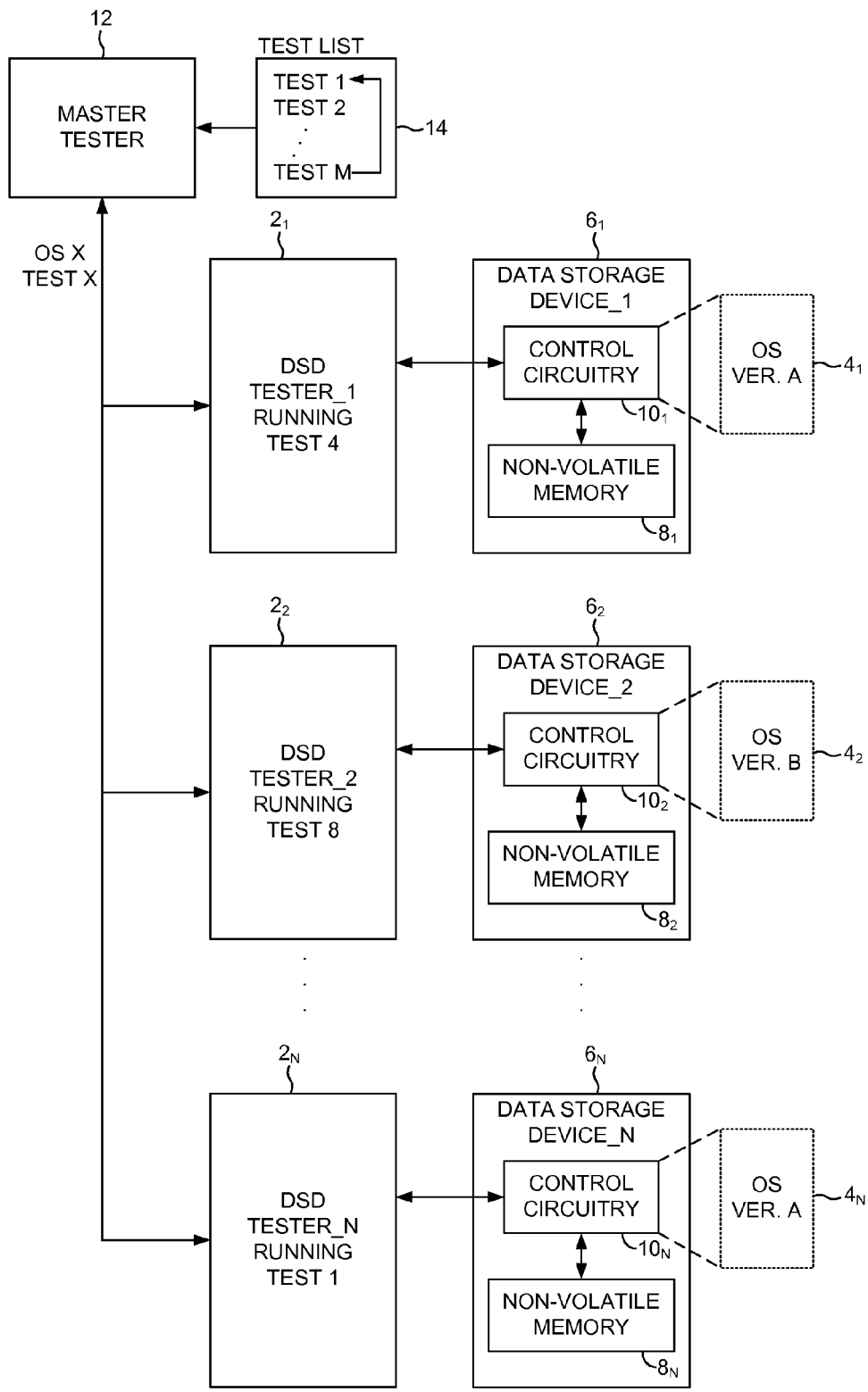
FIG. 1 shows a data storage device (DSD) test system comprising a master tester and a plurality of DSD testers, including a first DSD tester that downloads a first version of an operating system to a first DSD and operable to execute a first test on the first DSD, and a second DSD tester that downloads a second version of an operating system to a second DSD and executes a second test on the second DSD while the first DSD tester is executing the first test on the first DSD.

FIG. 1 shows a data storage device (DSD) test system according to an embodiment of the present invention comprising a plurality of DSD testers including a first DSD tester $2_1$ operable to download a first version of an operating system $4_1$ to a first DSD $6_1$ and execute a first test on the first DSD $6_1$, and a second DSD tester $2_1$ operable to download a second version of the operating system $4_2$ to a second DSD $6_2$ and execute a second test on the second DSD $6_2$ while the first DSD tester $2_1$ is executing the first test on the first DSD $6_1$.

In the embodiment of FIG. 1, each DSD comprises a suitable non-volatile memory 8 (e.g., a disk or a non-volatile semiconductor memory) and control circuitry 10 operable to interface with a host, such as the DSD tester 2. The control circuitry 10 executes an operating system for controlling various internal operations, such as interfacing with the host or accessing the non-volatile memory 8. Developing a new line of DSDs includes designing, testing, and updating the operating system toward a release version. In the embodiment of FIG. 1, when a new version of the operating system is available, the new version is downloaded to a DSD as each DSD tester finishes a current test and before executing a next test on the DSD rather than pause all of the DSD testers in order to download the new version to all the DSDs before continuing with the testing. In this manner, a new version of the operating system (e.g., version B in FIG. 1) may be downloaded to a second DSD $6_2$ while a first DSD $6_1$ continues running an older version of the operating system (e.g., version A in FIG. 1). When the first DSD tester $2_1$ finishes the current test on the first DSD $6_1$, the first DSD tester $2_1$ downloads the new version of the operating system to the first DSD $6_1$ before continuing with a next test. This embodiment of the present invention helps maximize the bandwidth of the DSD test system by ensuring the DSD testers are essentially always executing tests on the DSDs. In addition, when a new version of the operating system is ready to be tested, the new version can be downloaded as soon as any one of the DSD testers becomes available (finishes executing a current test). This helps expedite developing the operating system by ensuring new versions begin evaluation as soon as they become available for download to an available DSD tester.

In the embodiment of FIG. 1, the DSD test system comprises a master tester 12 operable to download the operating system as well as the next test to execute for each DSD tester $2_1$-$2_N$. Each DSD tester then downloads the operating system to the DSD and executes the next test on the DSD. When a new version of the operating system is available, the new version is loaded onto the master tester 12 which then downloads the new version to each DSD tester as they become available (finish executing the current test). In one embodiment, the master tester 12 maintains a database 14 of tests that are executed by the DSD testers and downloads the next test to the next available DSD tester based on any suitable algorithm (e.g., the next test in a consecutive sequence).

Figure 2A:
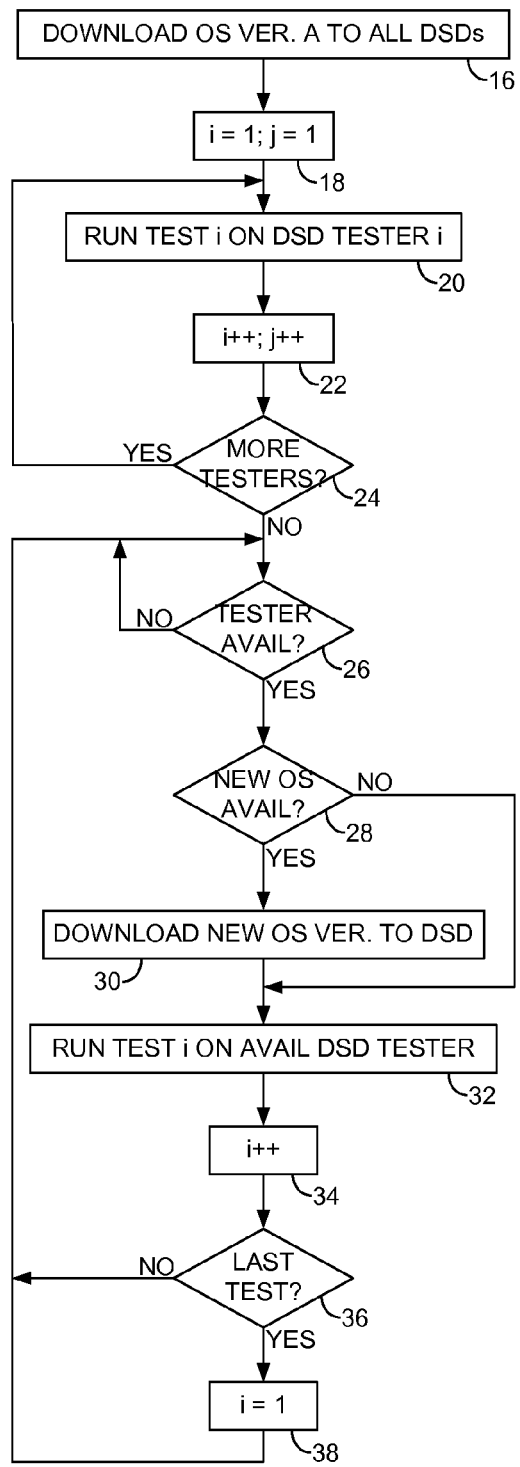
FIG. 2A is a flow diagram according to an embodiment of the present invention wherein when one of the DSD testers becomes available (finishes executing a current test on a DSD), if a new version of the operating system is available it is downloaded to the DSD before executing a next test on the DSD.

FIG. 2A is a flow diagram according to an embodiment of the present invention wherein to initialize the DSD test system a first version of the operating system (e.g., version A) is downloaded to all of the DSDs (step 16). A test index i is then initialized to the first test and a tester index j is initialized to the first DSD tester (step 18), and the first test is run on the first DSD tester (step 20). The test and tester index are incremented (step 22) and the next test is run on the next DSD tester (step 20) until all of the DSD testers are running a test (step 24). When one of the DSD testers finishes executing the current test and becomes available (step 26), the system determines whether a new version of the operating system is available (step 28). If so, the new version is downloaded to the DSD tester (step 30) and then a next test is run on the DSD tester (step 32). The test index is incremented (step 34) and if the last test has been reached (step 36), the test index is reset to one (step 38) so that the sequence of tests are re-executed in order. Other embodiments may execute the tests in a different order based on any suitable algorithm, and in an embodiment described below, a test may be skipped if it has already failed once for a current version of the operating system.

Figure 2B:
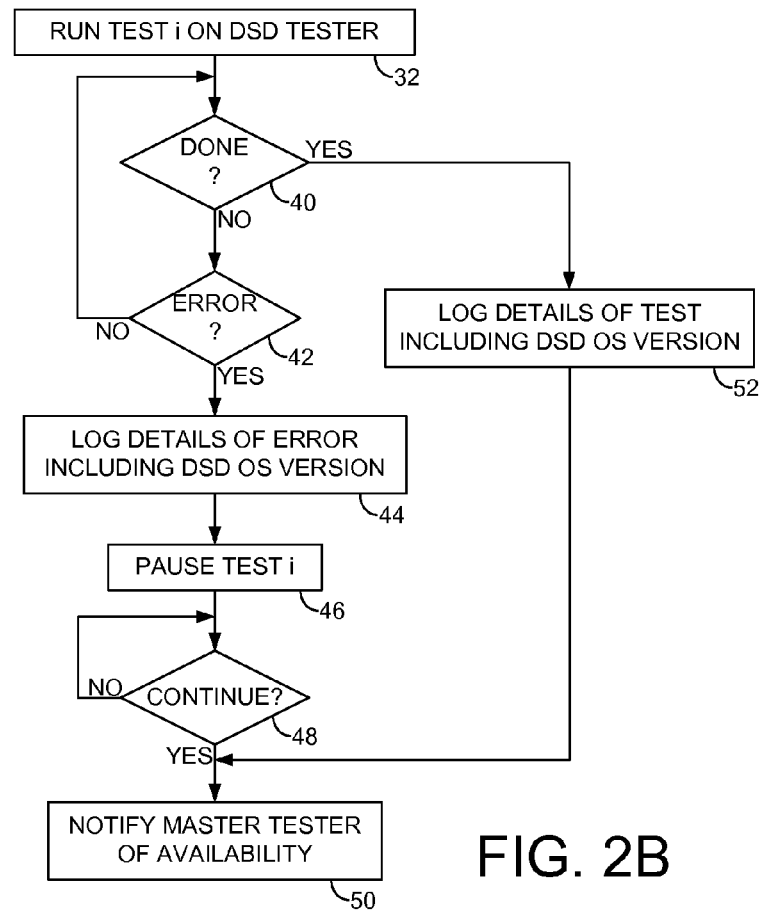
FIG. 2B is a flow diagram according to an embodiment of the present invention wherein when an error occurs the DSD tester pauses the current test and after a predetermined interval transmits an available status to the master tester.

FIG. 2B is a flow diagram according to an embodiment of the present invention which extends on the flow diagram of FIG. 2A, wherein after starting a test on a DSD tester (step 32) and while the test is running (step 40) an error occurs (step 42), the details of the error including the version of the operating system are logged (step 44), and the current test is paused (step 46). In one embodiment, the details of the error may be transmitted to a system administrator who may evaluate the DSD tester and/or the DSD while it is paused. The system administrator may then un-pause the DSD tester, or the DSD tester may un-pause automatically after a predetermined interval independent of the system administrator (step 48). In one embodiment, after un-pausing the DSD tester, the current test is aborted and an available status is transmitted to the master tester (step 50) so that the next test is downloaded to the DSD tester. If the current test completes without error (step 40), the details of the test are logged including the version of the operating system (step 52), and the availability status is transmitted to the master tester (step 50).

Figure 2C:
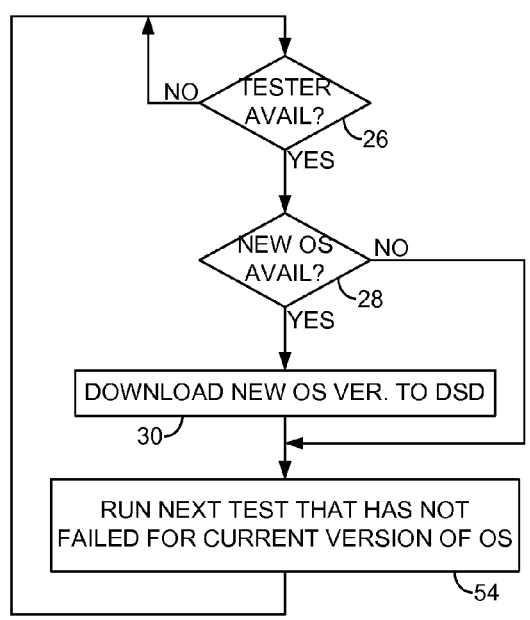
FIG. 2C is a flow diagram according to an embodiment of the present invention wherein a next test executed on an available DSD tester corresponds to a test that has not failed for the current version of the operating system running on the DSD.

FIG. 2C is a flow diagram according to an embodiment of the present invention which extends on the flow diagram of FIG. 2A, wherein when a DSD tester becomes available (step 26), and a new version of the operating system is not available (step 28), a next test is selected to run on the DSD tester based on whether a test has previously failed for the current version of the operating system (step 54). For example, if the tests are being run in a consecutive sequence, and the next test in the sequence was previously run and failed for the current version of the operating system (step 42 of FIG. 2B), the next test in the sequence is skipped until a test is selected that has not failed for the current version of the operating system. When a new version of the operating system becomes available and is downloaded to a DSD (step 30), one of the tests that was previously skipped may be selected for running on the DSD tester.

A different version of the operating system may comprise any suitable modification to any suitable file. For example, in one embodiment a different version of the operating system may be generated by modifying an executable file, and in another embodiment, a different version may be generated by modifying a configuration file (parameter file). For example, the operating system may comprise one or more parameter files used to configure the operating system, wherein the parameter settings may be modified in order to generate a different version of the operating system. For example, in an embodiment wherein the DSD comprises a disk drive, the parameters for servoing the head over the disk (e.g., seek parameters) may be modified in order to generate a different version of the operating system.

In one embodiment, a specific version of the operating system may be generated for different customers of the DSDs. Accordingly, a different version of the operating system may be an updated version for the same customer, or a different version of the operating system may be a version for a different customer. In one embodiment, the DSD test system may test DSDs for multiple customers and therefore download specific versions (including updated versions) to the DSD testers based on the target customer for the DSD. In addition, the test suite maintained in the database 14 by the master tester 12 (FIG. 1) may vary based on each specific customer such that the next test downloaded to a DSD tester may be selected based on the customer version of the operating system loaded into the DSD.

Figure 3:
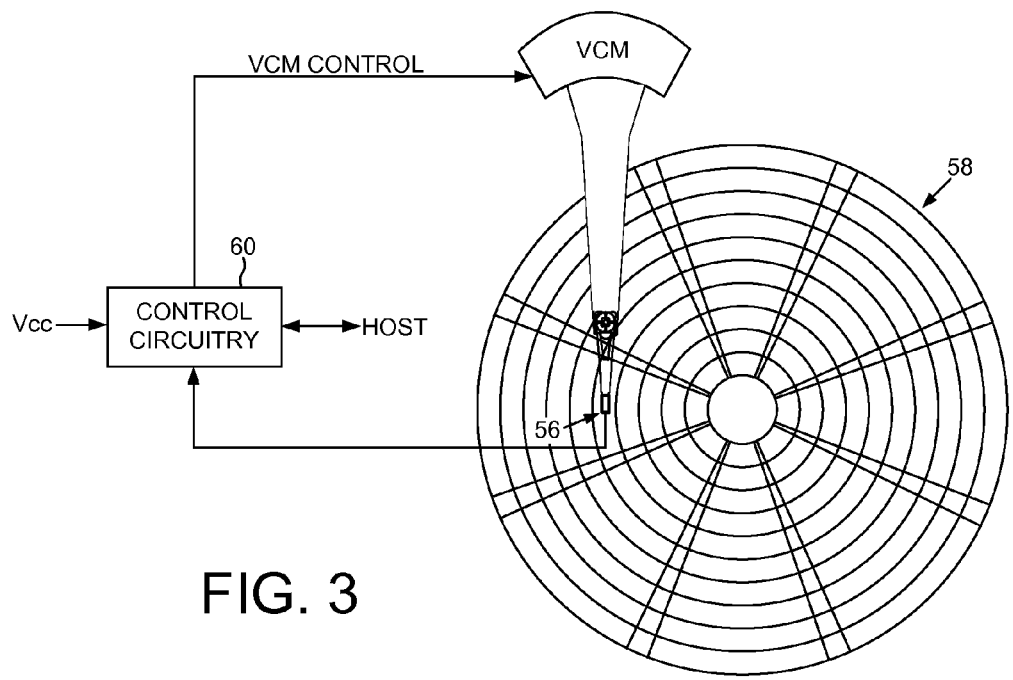
FIG. 3 shows an embodiment of the present invention wherein the DSD comprises a disk drive.
Figure 4:
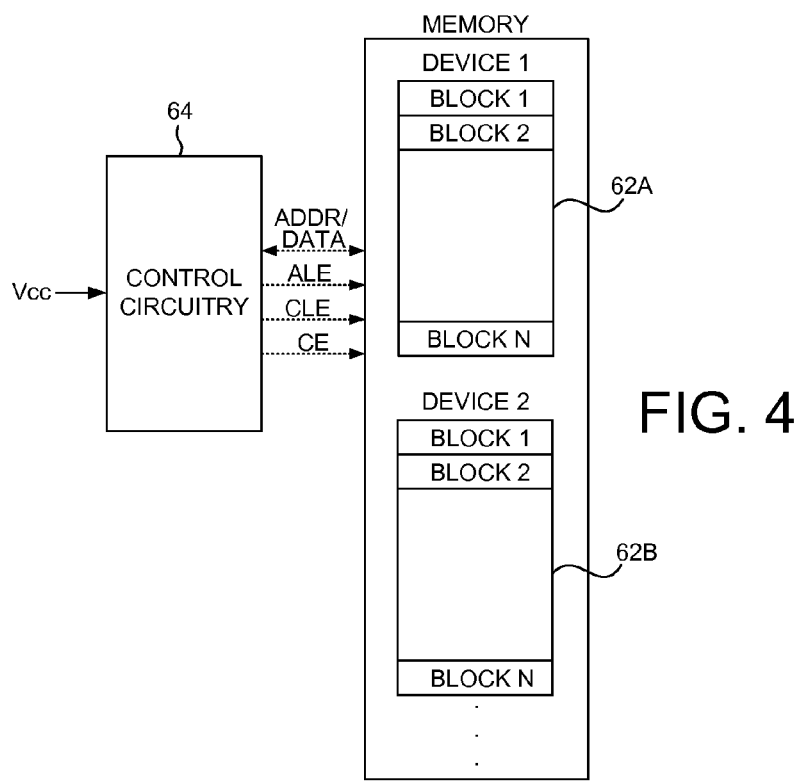
FIG. 4 shows an embodiment of the present invention wherein the DSD comprises a solid state drive.

The embodiments of the present invention may be employed in any suitable DSD comprising any suitable non-volatile memory. FIG. 3 shows a DSD comprising a disk drive including a head 56 actuated over a disk 58 and control circuitry 60 for interfacing with a host including a DSD tester. FIG. 4 shows a DSD comprising a solid state drive including a plurality of non-volatile semiconductor memories 62A, 62B, etc., such as flash memories, and control circuitry 64 for interfacing with a host including a DSD tester. A hybrid DSD may also be employed comprising components of a disk drive shown in FIG. 3 combined with the non-volatile semiconductor memories shown in FIG. 4.

What is claimed is:

1. A data storage device (DSD) test system comprising:
   a first DSD tester operable to download a first version of an operating system to a first DSD and execute a first test on the first DSD; and
   a second DSD tester operable to download a second version of the operating system to a second DSD and execute a second test on the second DSD while the first DSD tester is executing the first test on the first DSD.

2. The DSD test system as recited in claim 1, wherein the first DSD tester is operable to download the second version of the operating system to the first DSD after completing the first test on the first DSD.

3. The DSD test system as recited in claim 2, wherein after downloading the second version of the operating system to the first DSD, the first DSD tester is operable to execute a next test on the first DSD.

4. The DSD test system as recited in claim 3, wherein the next test corresponds to an oldest test executed out of a plurality of tests.

5. The DSD test system as recited in claim 3, wherein the next test corresponds to a test that has not failed while running the second version of the operating system.

6. The DSD test system as recited in claim 3, further comprising a master tester operable to download the first version of the operating system to the first DSD tester and operable to download the second version of the operating system to the first DSD tester.

7. The DSD test system as recited in claim 6, wherein the master tester is operable to download the first test to the first DSD tester and operable to download the next test to the first DSD tester.

8. The DSD test system as recited in claim 7, wherein the master tester is operable to download the second version of the operating system and the next test to the first DSD tester after the DSD tester transmits an available status to the master tester.

9. The DSD test system as recited in claim 8, wherein the first DSD tester is operable to pause the first test when an error occurs.

10. The DSD test system as recited in claim 9, wherein after pausing the first test for a predetermined interval, the first DSD tester is operable to transmit the available status to the master tester.

11. A method of operating a data storage device (DSD) test system comprising the steps of:
   downloading a first version of an operating system to a first DSD and executing a first test on the first DSD; and
   downloading a second version of the operating system to a second DSD and executing a second test on the second DSD while a first DSD tester is executing the first test on the first DSD.

12. The method as recited in claim 11, further comprising downloading the second version of the operating system to the first DSD after completing the first test on the first DSD.

13. The method as recited in claim 12, wherein after downloading the second version of the operating system to the first DSD, further comprising executing a next test on the first DSD.

14. The method as recited in claim 13, wherein the next test corresponds to an oldest test executed out of a plurality of tests.

15. The method as recited in claim 13, wherein the next test corresponds to a test that has not failed while running the second version of the operating system.

16. The method as recited in claim 13, further comprising a master tester downloading the first version of the operating system to the first DSD and downloading the second version of the operating system to the first DSD.

17. The method as recited in claim 16, further comprising the master tester downloading the first test to the first DSD and downloading the next test to the first DSD.

18. The method as recited in claim 17, further comprising the master tester downloading the second version of the operating system and the next test to the first DSD after receiving an available status.

19. The method as recited in claim 18, further comprising pausing the first test when an error occurs.

20. The method as recited in claim 19, wherein after pausing the first test for a predetermined interval, further comprising transmitting the available status to the master tester.

\* \* \* \* \*